United States Patent [19]

Hughes et al.

[11] 3,904,981

[45] Sept. 9, 1975

[54] ULTRAFAST SPATIALLY SCANNING LASER SYSTEM

[75] Inventors: Richard Swart Hughes, China Lake, Calif.; Robert D. Matulka, Falls Church, Va.

[73] Assignee: The United States of America as represented by the Secretary of the Navy, Washington, D.C.

[22] Filed: Oct. 10, 1974

[21] Appl. No.: 513,783

[52] U.S. Cl. .......................................... 331/94.5 K
[51] Int. Cl.² ............................................. H01S 3/10
[58] Field of Search .................................... 331/94.5

[56] References Cited

UNITED STATES PATENTS 3,684,979  8/1972  Myer et al. ..................... 331/94.5 L Primary Examiner—William L. Sikes
Attorney, Agent, or Firm—R. S. Sciascia; Roy Miller

[57] ABSTRACT

An ultrafast spatially scanning laser system comprising a continuously tunable dye laser, electrically tunable bandpass filter and an extra cavity dispersive element for converting wavelength scan to a spatial scan.

5 Claims, 1 Drawing Figure

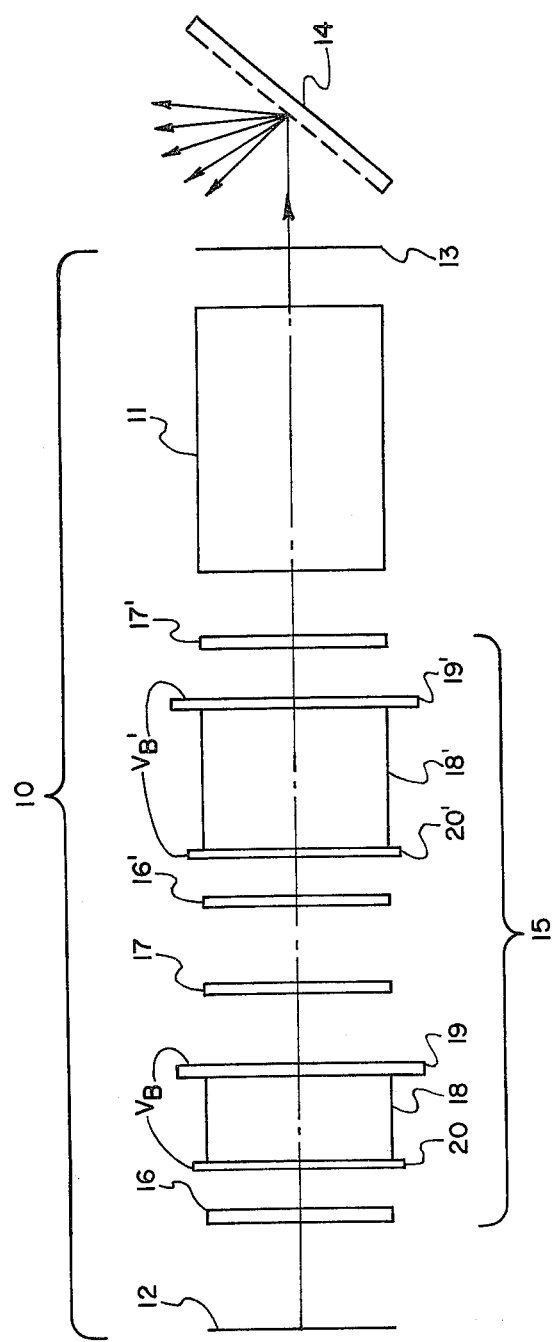

ULTRAFAST SPATIALLY SCANNING LASER SYSTEM

CROSS REFERENCE TO RELATED APPLICATION

U.S. pat. application Ser. No. 287,112, filed Sept. 1, 1972, "Laser Scanner" by Richard Swart Hughes, et al.

BACKGROUND OF THE INVENTION

Field of the Invention

The present invention is concerned with causing an output laser beam to be scanned spatially at a very high rate. Attempts have been made to do this previously, among which one comprises physically rotating an output mirror or prism or using a galvanometer coupled to a mirror or apparatus such as disclosed in co-pending U.S. pat. application Ser. No. 287,112, "Laser Scanner" by Richard Swart Hughes et al., filed Sept. 1, 1972.

SUMMARY

The invention comprises a unique combination of optical and electro-optical elements which will provide for an ultrafast scanning source of coherent radiation. The combination comprises the laser cavity, a continuously tunable laser positioned within the cavity, a 100 percent reflective mirror at one end of the cavity, an electronically tunable bandpass filter positioned between the 100 percent reflective mirror and the laser, a partially reflective output mirror within the cavity and a dispersive element positioned outside the laser cavity in optical alignment with the output beam of the laser for converting wavelength scan to a spatial scan.

BRIEF DESCRIPTION OF THE DRAWING

The FIGURE is a schematically exploded view of a preferred embodiment of the present invention.

DESCRIPTION OF THE PREFERRED EMBODIMENT

The system will be described with respect to the FIGURE wherein a laser cavity 10 contains a continuously tunable dye laser 11, a 100 percent reflective mirror 12, partially reflective mirror 13, extra cavity dispersive element 14 and electronically tunable bandpass filter 15. A single stage of the filter is made up of two linear polarizers 16 and 17 with a variable retardance retarder 18 positioned therebetween. The retarder is positioned between transparent electrodes 19 and 20 and a potential difference is applied to the electrodes through a source of potential energy as at $V_B$.

The filter 15 may comprise more than one stage and the second stage in the present instance is indicated by the primed numbers and otherwise operates essentially the same as the first described stage.

The continuously tunable laser, which may be an organic dye laser for example, is made up of an appropriate laser medium along with its optical resonant cavity. The optical cavity is terminated at either end by a 100 percent reflector 12 and a partially transmitting output mirror 13. The means for exciting the laser medium 11 is not shown but it could be one of several means such as flashlamps, another laser, etc., as is well known in the art at the present time.

Inserted within the laser cavity 10 is an electronically tunable bandpass filter 15. The filter is termed a Lyot filter after the man who invented it. Such a filter is described in the Annales D'Astrophysique, page 31 (1944). A singe stage of the filter element is made up of two linear polarizers with a variable retardance retarder between the polarizers. The single stage filter has a rather broad passband which can be tuned by varying the voltage such as $V_B$ applied to the variable retarder through the electrodes 19 and 20. The retardance of a retarder is given by $R = JL/\lambda$, where $R$ is the retardance, $J$ is the birefringence and can be varied extremely rapidly by varying an applied electric field and $\lambda$ is the wavelength.

It is noted that the retardance is nonachromatic, i.e., it is a function of the wavelength $\lambda$. Thus, with the fast (principal) direction of the retarder oriented at 45° with respect to the direction of polarization of polarizers 16' and 17' (i.e., W.R.T. the vertical) and with the retardance set to ¼λ for a given λ the filter has periodic passbands at λ which are quite broad. If a second stage is added to the filter by adding another variable retarder 18' whose thickness is a whole multiple of the thickness of 18 the passband of the filter is much narrowed and the laser can sustain laser action only within the narrow spectral range. H. Walthen and J. L. Hall describe such a laser in an article titled "TUNABLE DYE LASER WITH NARROW SPECTRAL OUTPUT" Applied Physics Letters, Vol. 17, No. 6, Sept. 15, 1970, pages 239–242.

The last element involved in the ultrafast spatially scanning laser is an extra cavity dispersive element 14. This could be a diffraction grating or prism, etc., The dispersive element 14 in effect changes the wavelength scan of the laser into a spatial scan thus providing a physical separation of one wavelength from another.

Walthen and Hall, cited previously, describe a laser which employs a Lyot filter to achieve part of its tunability. It is also pointed out that an extracavity dispersive element has been used to scan a tunable laser beam as in co-pending U.S. pat. application Ser. No. 287,112. However, this is the first combination of three elements that has been used in such a fashion whereby the system can provide for a spatial scan rate which is at least 100 times faster than the acousto-optical effect can provide for.

What is claimed is:

1. An ultrafast spatially scanning laser system comprising:
    a laser cavity;
    a laser medium continuously tunable over a bandwidth positioned within said laser cavity for providing an output laser beam;
    an electronically tunable bandpass filter positioned within said cavity in optical alignment with said laser medium;
    tuning means operatively connected to said filter for causing the passband of the filter to be scanned in wavelength thereby causing the output wavelength of the laser to change accordingly; and
    an extracavity dispersive element in optical alignment with said laser medium and said filter for changing the wavelength scan of the laser into a spatial scan of the laser beam.

2. An ultrafast spatially scanning laser system as set forth in claim 1 wherein:
    said laser cavity includes a 100 percent reflective mirror positioned within said laser cavity;
    said electronically tunable bandpass filter being physically positioned between said laser medium and said 100 percent reflective mirror.

3. An ultrafast spatially scanning laser system as set forth in claim 2 wherein;
   said laser cavity includes a partially reflective mirror positioned in said laser cavity;
   said partially reflective mirror being physically positioned between said laser medium and said dispersive element.

4. An ultrafast spatially scanning laser system as set forth in claim 1 wherein;
   said electronically tunable bandpass filter comprises at least a single stage filter element made up of two linear polarizers and a variable retardance retarder between the polarizers.

5. An ultrafast spatially scanning laser system as set forth in claim 1 wherein;
   said electronically tunable bandpass filter means comprises multi-stage filter elements;
   each filter element being made up of two linear polarizers with a variable retardance retarder between the polarizers.

* * * * *